United States Patent

Shinohara et al.

[11] Patent Number: 5,856,841
[45] Date of Patent: Jan. 5, 1999

[54] IMAGE FORMATION METHOD AND IMAGE FORMATION APPARATUS FOR FORMING A HIGH DEFINITION AND HIGH QUALITY IMAGE

[75] Inventors: Koichiro Shinohara; Masahiro Takamatsu; Akira Ishii; Hideki Moriya; Kenji Ogi, all of Nakai-machi, Japan

[73] Assignee: Fuji Xerox Co., Ltd., Tokyo, Japan

[21] Appl. No.: 740,127

[22] Filed: Oct. 24, 1996

[30] Foreign Application Priority Data

Dec. 20, 1995 [JP] Japan .................................. 7-332371

[51] Int. Cl.⁶ .................................................. B41J 2/405
[52] U.S. Cl. ............................................ 347/143; 347/900
[58] Field of Search ................................ 347/256, 253, 347/254, 131, 134, 143, 144, 900; 358/296, 298; 395/107

[56] References Cited

U.S. PATENT DOCUMENTS

| 4,754,291 | 6/1988 | Horikara ................................ 347/256 |
| 5,194,879 | 3/1993 | Kotabe et al. ......................... 347/254 |

FOREIGN PATENT DOCUMENTS

A-51-100742  9/1976  Japan .
A-54-38130   3/1979  Japan .

Primary Examiner—Benjamin R. Fuller
Assistant Examiner—Raquel Yvette Gordon
Attorney, Agent, or Firm—Oliff & Berridge, PLC

[57] ABSTRACT

To form an exposed image with striking contrast on photosensitive material and form a high definition and high quality image, a first beam modulated according to an image signal and a second beam modulated according to an inverted image signal generated by inverting this image signal with smaller deelectrification effect than the first beam are synthesized on the photosensitive material.

32 Claims, 17 Drawing Sheets

FIG.5(a) IMAGE SIGNAL
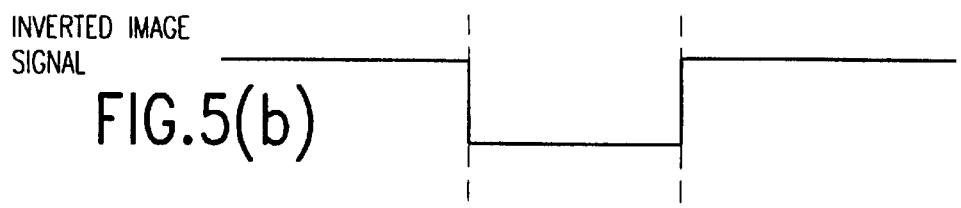
FIG.5(b) INVERTED IMAGE SIGNAL
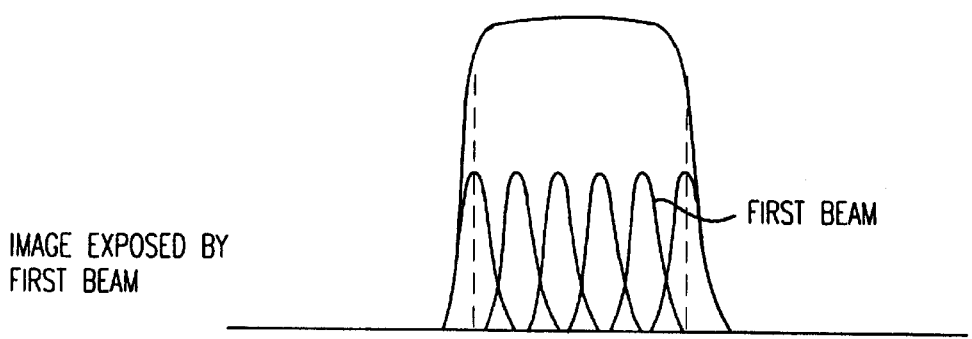
FIG.5(c) IMAGE EXPOSED BY FIRST BEAM
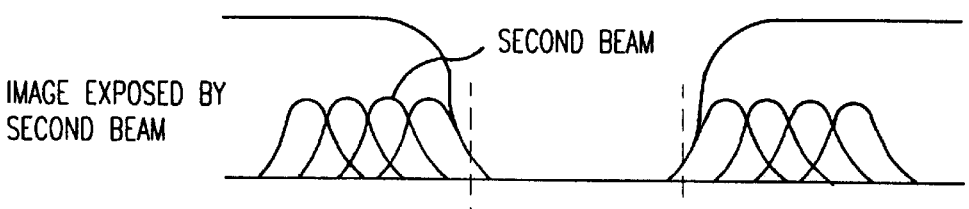
FIG.5(d) IMAGE EXPOSED BY SECOND BEAM
FIG.5(e) SYNTHESIZED EXPOSED IMAGE

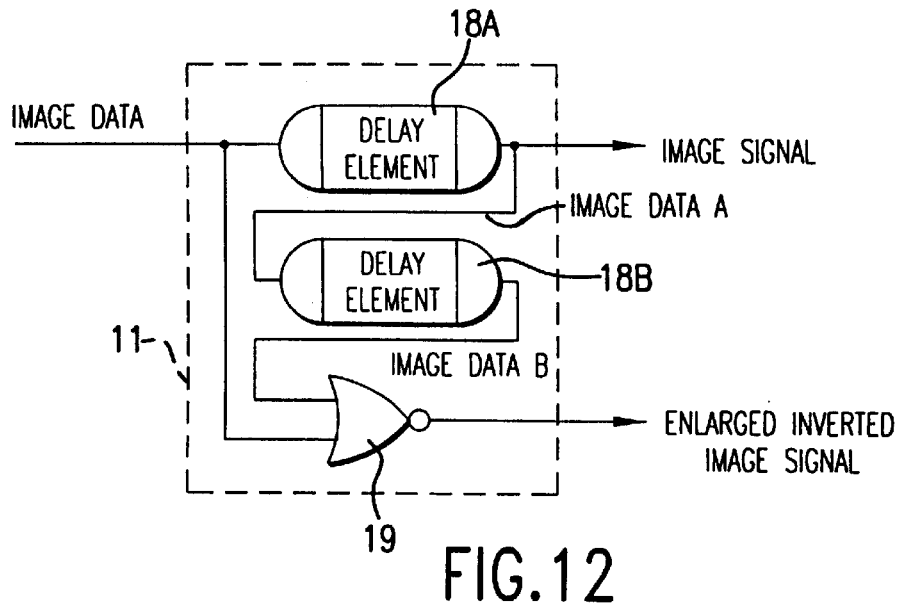
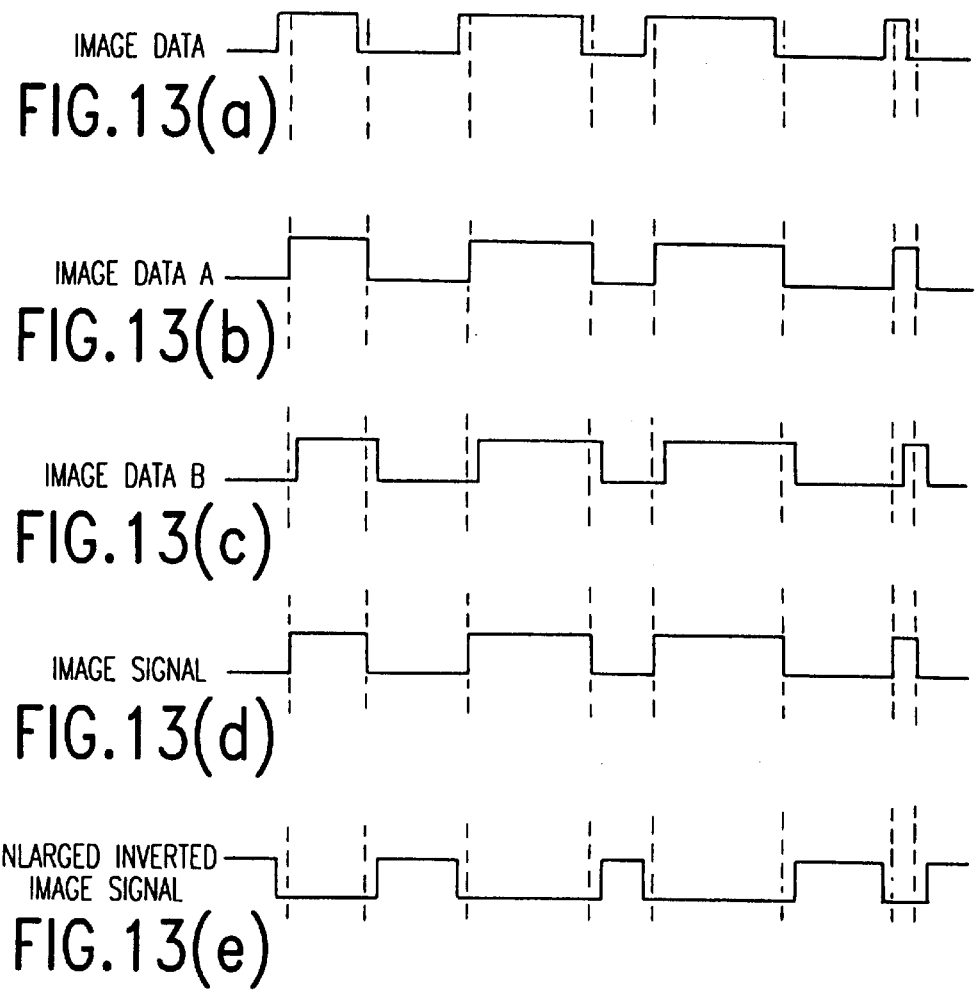

IMAGE SIGNAL

FIG.14(a)

ENLARGED INVERTED IMAGE SIGNAL

FIG.14(b)

IMAGE EXPOSED BY FIRST BEAM — FIRST BEAM

FIG.14(c)

IMAGE EXPOSED BY SECOND BEAM — SECOND BEAM

FIG.14(d)

SYNTHESIZED EXPOSED IMAGE

FIG.14(e)

IMAGE SIGNAL
(N) FOR
FIRST BEAM
A ──────────┐     ┌────── A'
            └─────┘
FIG.20(a)
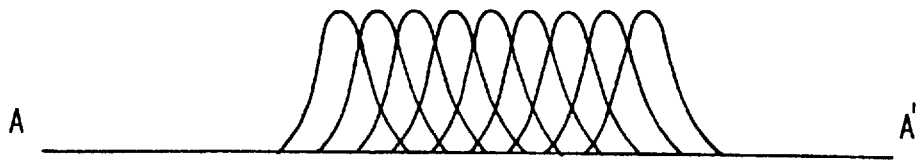
A ─────────────────── A'
EXPOSURE PATTERN BY FIRST BEAM ON LINE A-A
FIG.20(b)
ENLARGED
INVERTED
IMAGE SIGNAL    A ─────┐          ┌───── A'
(N+1) FOR              └──────────┘
SECOND BEAM
FIG.21(a)
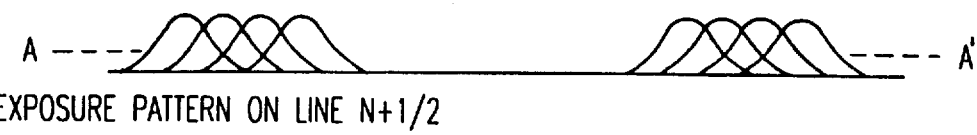
EXPOSURE PATTERN ON LINE N+1/2
FIG.21(b)
SYNTHESIZED
EXPOSED IMAGE
A ─────────────────── A'
FIG.22

IMAGE FORMATION METHOD AND IMAGE FORMATION APPARATUS FOR FORMING A HIGH DEFINITION AND HIGH QUALITY IMAGE

BACKGROUND OF THE INVENTION

1. Field of the Invention

The present invention relates to an image formation method for forming an image by scanning a beam and exposing photosensitive material and an image formation apparatus, particularly relates to an image formation method and an image formation apparatus through which a high quality image can be formed by forming a contrast exposed image on photosensitive material.

2. Description of the Related Art

For an image formation apparatus such as a digital copying machine and a laser printer for forming an image using a beam, an image formation apparatus in which a beam modulated according to image information is reflected and deflected by a deflecting system, for example a polygon mirror and image information is recorded, scanning the scanned face of photosensitive material and others using such a reflected and deflected beam is generally known.

Recently, in such an image formation apparatus, high-speed image formation at high resolution is enabled by the appearance of a high-speed polygon mirror, high-speed image processing, simultaneous scanning in a plurality of scanning lines and others, and resolution is being enhanced. However, for the contrast of an exposed image contributing to the definition and quality of an image, as the reduction of a beam diameter is limited by the constraint of an optical system, sufficient improvement is not performed. Therefore, it is difficult to provide a high definition character and line drawn image required in the field of printing and desk top publishing.

Generally, in an image formation apparatus for forming an exposed image on photosensitive material by the on-off modulation of a beam, the energy distribution profile of an exposed image is obtained by the following convolution of the intensity distribution profile Bp(x, y) of a beam imaged on photosensitive material and a modulated pulse profile Mp(x, y):

$$Bp*Mp(x, y) = \int Bp(\xi,\eta) \cdot Mp(x-\xi, y-\eta) d\xi d\eta \quad (1).$$

Therefore, unless a beam diameter is reduced when resolution is enhanced, the contrast of an exposed image is decreased and the reproducibility of gradation is deteriorated. For example, when a modulated pulse profile is replaced with "M2(x, y)≡Mp(2x, 2y)" if resolution is doubled, the above expression (1) is as follows:

$$\begin{aligned}Bp*M2(x, y) &= \int Bp(\xi, \eta) \cdot M2(x - \xi, y - \eta) d\xi d\eta \\ &= \int Bp(\xi, \eta) \cdot Mp(2x - 2\xi, 2y - 2\eta) d\xi d\eta \\ &= \int Bp(1/2\xi, 1/2\eta) \cdot Mp(x - \xi, y - \eta) d\xi d\eta,\end{aligned}$$

and to obtain the similar contrast, a beam diameter is required to be halved.

In the meantime, according to the examination of an optical system for imaging, the minimum beam diameter co in the propagation of Gaussian beam is obtained by the following expression:

$$\omega_0 = \lambda/(n \cdot \pi \cdot \theta_{beam}).$$

In this case, $\theta_{beam}$ is an angle at which a beam is focused, $\lambda$ is a wavelength and n is a refractive index, and if the diameter of a beam incident to an fθ lens is D and the focal length of an fθ lens is f, $\theta_{beam}$ is expressed by the following expression:

$$\theta_{beam} = \tan^{-1}(D/(2 \cdot f)).$$

Therefore, to reduce a beam diameter, it is required to reduce a wavelength $\lambda$ or to extend the diameter D of a beam incident to an fθ lens, that is, the diameter of a beam incident to a polygon mirror.

In such a background, a conventional image formation apparatus using a semiconductor laser which emits a beam with a short wavelength is proposed and a beam diameter is reduced by obtaining a beam with a shorter wavelength up to 680 nm, compared with a wavelength up to 780 nm of a general semiconductor laser. If an argon laser or a combination of a semiconductor laser and a wavelength sensing element is used as a light source, a beam with even a shorter wavelength can be obtained.

In the meantime, for another conventional image formation apparatus, technique for simultaneously scanning a plurality of beams horizontally and reducing the rotating speed of a polygon mirror is disclosed in, for example Japanese Unexamined Patent Publication Nos. Sho 51-100742 (1976) and Sho 54-38130 (1979). According to these image formation apparatuses, a plurality of beams can be simultaneously scanned horizontally, the rotating speed of a polygon mirror can be reduced and as the radius of the polygon mirror can be extended and the width of each face can be secured sufficiently if the rotating speed of the polygon mirror can be reduced, the diameter of a beam incident to the polygon mirror can be extended.

However, according to a conventional image formation apparatus, in the case of the former, as a reduced wavelength is 680 nm, compared with the wavelength up to 780 nm of a general semiconductor laser, only approximately 12% of improvement can be obtained and a beam diameter cannot be reduced to the extent that the contrast of an exposed image on photosensitive material is enhanced. If an argon laser or a combination of a semiconductor laser and a wavelength sensing element is used as a light source, an apparatus is large-sized, costs are increased and as the sensitivity in a short wavelength area of a general organic photosensitive material in the current electrophotographic process is low, there is a problem that image formation is difficult.

In the case of the latter, as the effect of a polygon mirror upon windage loss torque more greatly depends upon the diameter of the polygon mirror than the rotating speed, the radius of the polygon mirror cannot be extended so much and there is a limit in extending the diameter of a beam incident to the polygon mirror. Therefore, a beam diameter cannot be reduced to the extent that the contrast of an exposed image on photosensitive material is enhanced.

SUMMARY OF THE INVENTION

Therefore, an object of the present invention is to provide an image formation method and an image formation apparatus for forming an exposed image with striking contrast on photosensitive material and forming a high definition and high quality image.

The present invention is made to solve the above problems and the present invention provides an image formation method in which to form an exposed image with striking contrast on photosensitive material and to form a high definition and high quality image, an image signal generated by processing image information and an inverted image signal generated by inverting this image signal are output, a first beam with predetermined luminous intensity which is modulated according to the image signal and a second beam with luminous intensity smaller than the predetermined luminous intensity which is modulated according to the inverted image signal are emitted, a synthesized beam is produced by synthesizing the first beam and the second beam and the synthesized beam is scanned horizontally on photosensitive material which is moved vertically so that an electrostatic latent image is formed on the photosensitive material.

It is desirable that the diameter of the above first beam on the photosensitive material is controlled so that it is smaller than that of the second beam on the photosensitive material.

It is desirable that the above first and second beams are emitted from a semiconductor laser array provided with first and second oscillation areas which emit two beams different in a spreading angle.

It is desirable that the above first and second beams are emitted from a semiconductor laser array provided with first and second oscillation areas which emit two beams equal in a spreading angle and arranged so that optical distance between the respective first and second oscillation areas and the photosensitive material is different.

It is desirable that the above first and second beams are emitted from a semiconductor laser array provided with first and second oscillation areas which emit two beams equal in a spreading angle and one of the two beams equal in a spreading angle is defocused on the photosensitive material.

It is desirable that the above inverted image signal is turned off ahead by predetermined time from the timing of turning on the image signal and is turned on behind by predetermined time from the timing of turning off the image signal.

It is desirable that the above first beam is emitted in the quantity of light in which development can be obtained on the photosensitive material and the above second beam is emitted in the quantity of light in which development cannot be obtained on the photosensitive material.

To achieve the above object, the present invention also provides an image formation method in which an image signal generated by processing image information and an inverted image signal generated by inverting this image signal are output, a first beam with predetermined luminous intensity which is modulated according to the image signal and a second beam with luminous intensity smaller than the predetermined luminous intensity which is modulated according to the inverted image signal are emitted at respective predetermined timing so that respective imaged points are equal and the first and second beams are scanned horizontally on photosensitive material which is moved vertically so that an electrostatic latent image can be formed on the photosensitive material.

It is desirable that the diameter of the above first beam on the photosensitive material is controlled so that it is smaller than that of the second beam on the photosensitive material.

It is desirable that the above first and second beams are emitted from a semiconductor laser array provided with first and second oscillation areas which emit two beams different in a spreading angle.

It is desirable that the above first and second beams are emitted from a semiconductor laser array provided with first and second oscillation areas which emit two beams equal in a spreading angle and arranged so that optical distance between the respective first and second oscillation areas and the photosensitive material is different.

It is desirable that the above first and second beams are emitted from a semiconductor laser array provided with first and second oscillation areas which emit two beams equal in a spreading angle and one of the two beams equal in a spreading angle is defocused on the photosensitive material.

It is desirable that the above inverted image signal is turned off ahead by predetermined time from the timing of turning on the image signal and is turned on behind by predetermined time from the timing of turning off the image signal.

It is desirable that the above first and second beams are emitted so that respective imaged points on the photosensitive material are off by predetermined distance vertically.

It is desirable that the above first beam is emitted in the quantity of light in which development can be obtained on the photosensitive material and the above second beam is emitted in the quantity of light in which development cannot be obtained on the photosensitive material.

To achieve the above object, the present invention also provides an image formation apparatus provided with signal generating means for generating an image signal obtained by processing image information and an inverted image signal obtained by inverting this image signal, a first light source which emits a first beam modulated according to an image signal with predetermined luminous intensity, a second light source which emits a second beam modulated according to an inverted image signal with luminous intensity smaller than the predetermined luminous intensity, synthesizing means for synthesizing the first beam and the second beam, scanning means for scanning a synthesized beam which is synthesized by the synthesizing means horizontally, photosensitive material which receives the exposure of a synthesized beam, being moved vertically and forms an electrostatic latent image and control means for controlling the timing of emission of the first and second light sources.

It is desirable that the diameter of the above first beam on the photosensitive material is controlled so that it is shorter than that of the second beam on the photosensitive material.

It is desirable that the above first and second light sources are a semiconductor laser array which emits beams different in a spreading angle from its first and second oscillation areas.

It is desirable that the above first and second light sources are a semiconductor laser array which emits two beams equal in a spreading angle from its first and second oscillation areas and this semiconductor laser array is arranged so that optical distance between the respective first and second oscillation areas and the photosensitive material is different.

It is desirable that the above first and second light sources are constituted by a semiconductor laser array which emits two beams equal in a spreading angle from its first and second oscillation areas and optical means for defocusing one of the two beams equal in a spreading angle on the photosensitive material.

It is desirable that the above signal generating means turns off the image signal ahead by predetermined time from the timing of turning on the signal and turns on the image signal behind by predetermined time from the timing of turning off the signal so as to generate an inverted image signal.

It is desirable that the above photosensitive material also maintains its surface potential so that it is equal to or higher than developing potential when the photosensitive material receives the second beam and is provided with a photosensitive characteristic for deelectrifying the first beam substantially completely when the photosensitive material receives the first beam.

To achieve the above object, the present invention further provides an image formation apparatus provided with signal generating means for generating an image signal obtained by processing image information and an inverted image signal obtained by inverting this image signal, a first light source for emitting a first beam with predetermined luminous intensity which is modulated according to an image signal, a second light source for emitting a second beam with luminous intensity smaller than the predetermined luminous intensity which is modulated according to an inverted image signal, scanning means for scanning the above first and second beams from the first and second light sources horizontally, photosensitive material for receiving the exposure of the first and second beams, being moved vertically and forming an electrostatic latent image and control means for controlling the timing of emission of the first and second light sources so that the first beam emitted from the first light source and the second beam emitted from the second light source are synthesized on the imaged face of the photosensitive material.

It is desirable that the diameter of the above first beam on the photosensitive material is controlled so that it is shorter than that of the second beam on the photosensitive material.

It is desirable that the above first and second light sources are a semiconductor laser array which emits beams different in a spreading angle from its first and second oscillation areas.

It is desirable that the above first and second light sources are a semiconductor laser array which emits two beams equal in a spreading angle from its first and second oscillation areas and this semiconductor laser array is arranged so that optical distance between the respective first and second oscillation areas and the photosensitive material is different.

It is desirable that the above first and second light sources are constituted by a semiconductor laser array which emits two beams equal in a spreading angle from its first and second oscillation areas and optical means for defocusing one of the two beams equal in a spreading angle on the photosensitive material.

It is desirable that the above signal generating means turns off the image signal ahead by predetermined time from the timing of turning on the signal and turns on the image signal behind by predetermined time from the timing of turning off the signal so as to generate an inverted image signal.

It is desirable that the above first and second light sources, the above scanning means and the above photosensitive material are arranged so that the above first and second beams form images off by predetermined distance vertically on the photosensitive material.

It is desirable that the above photosensitive material also maintains its surface potential so that it is equal to or higher than developing potential when the photosensitive material receives the second beam and is provided with a photosensitive characteristic for deelectrifying the first beam substantially completely when it receives the first beam.

BRIEF DESCRIPTION OF THE DRAWINGS

FIGS. 5(a)–5(e) are explanatory drawings showing the relationship between the waveform of a signal showing operation in the first embodiment and an exposed image;

FIG. 12 is an explanatory drawing showing an image signal controller in a fifth embodiment according to the present invention;

FIGS. 13(a)–13(e) are timing charts showing the operation of the image signal controller in the fifth embodiment;

FIGS. 14(a)–14(e) are explanatory drawings showing the relationship between the waveform of a signal showing operation in the fifth embodiment and an exposed image;

FIGS. 20(a) and 20(b) are explanatory drawings showing an image signal on a horizontal scanning line (line N) by a first beam on the line A–A' in FIG. 18 and an exposure pattern;

FIGS. 21(a) and 21(b) are explanatory drawings showing an enlarged inverted image signal on a horizontal scanning line (N+½ line) by the second beam adjacent to the line A–A' in FIG. 18 and an exposure pattern;

FIG. 22 is an explanatory drawing showing a synthesized exposed image on the line A–A' in FIG. 18;

DESCRIPTION OF THE PREFERRED EMBODIMENTS

An image formation method and an image formation apparatus according to the present invention will be described in detail below referring to attached drawings.

Figure 1:
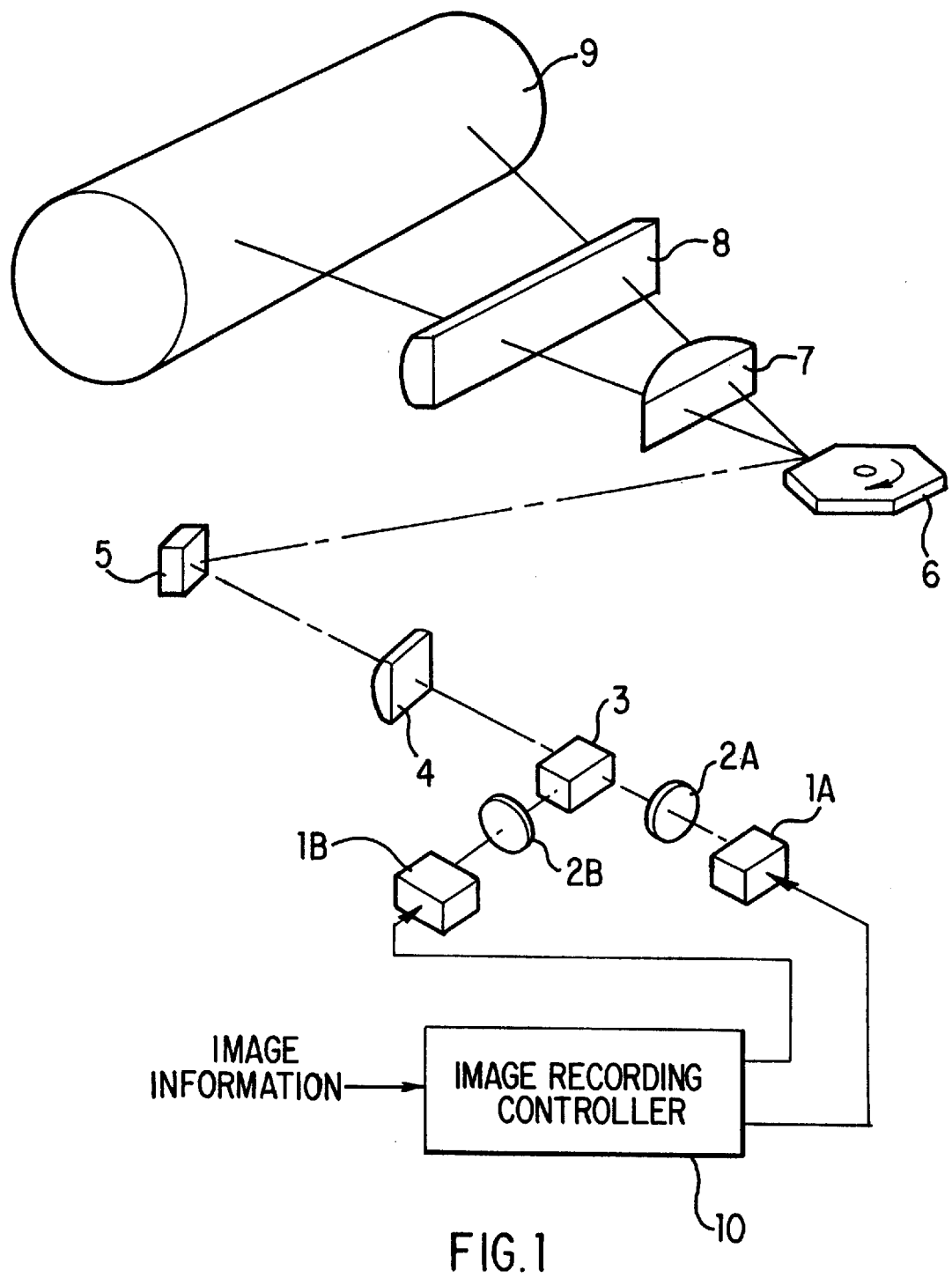
FIG. 1 is an explanatory drawing showing a first embodiment according to the present invention.

FIG. 1 shows the constitution of an image formation apparatus equivalent to a first embodiment according to the present invention. This image formation apparatus is constituted by a semiconductor laser 1A which emits a first beam modulated according to an image signal, a semiconductor laser 1B which emits a second beam modulated according to an inverted image signal to which an image signal is inverted, collimator lenses 2A and 2B for converting the diffused first and second beams emitted from the semiconductor lasers 1A and 1B to parallel beams, a beam splitter 3 for synthesizing the first and second beams by transmitting the first beam which passes through the collimator lens 2A and by reflecting the second beam which passes through the collimator lens 2B, a cylindrical lens 4 for focusing the first and second beams in the vertical scanning direction, a reflector 5 for reflecting the first and second beams which pass through the cylindrical lens 4 in a predetermined direction, a polygon mirror 6 for reflecting and deflecting the first and second beams incident from the reflector 5, an fθ lens 7 for focusing a deflection beam which is reflected and deflected by the polygon mirror 6 in the horizontal scanning direction and scanning at constant velocity on a predetermined horizontal scanning line, a cylindrical lens 8 for focusing a deflection beam deflected by the polygon mirror 6 in the vertical scanning direction and focusing it on a predetermined horizontal scanning line, a photoconductive drum 9 for forming an electrostatic latent image by scanning by the first and second beams by being arranged with its exposure line coincident with a predetermined horizontal scanning line, an image record controller 10 for inputting image information from an external host and others and controlling the semiconductor lasers 1A and 1B, a developing machine not shown for developing the above electrostatic latent image formed by the photoconductive drum 9 by toner, a transfer machine not shown for transferring a toner image on the photoconductive drum 9 on a recording medium, a fixing machine not shown for fixing a transferred image on the recording medium, and an optical parameter is designed so that the diameter of the first beam is 30 μm and that of the second beam is 60 μm on the imaged face of the photoconductive drum 9.

Figure 2:
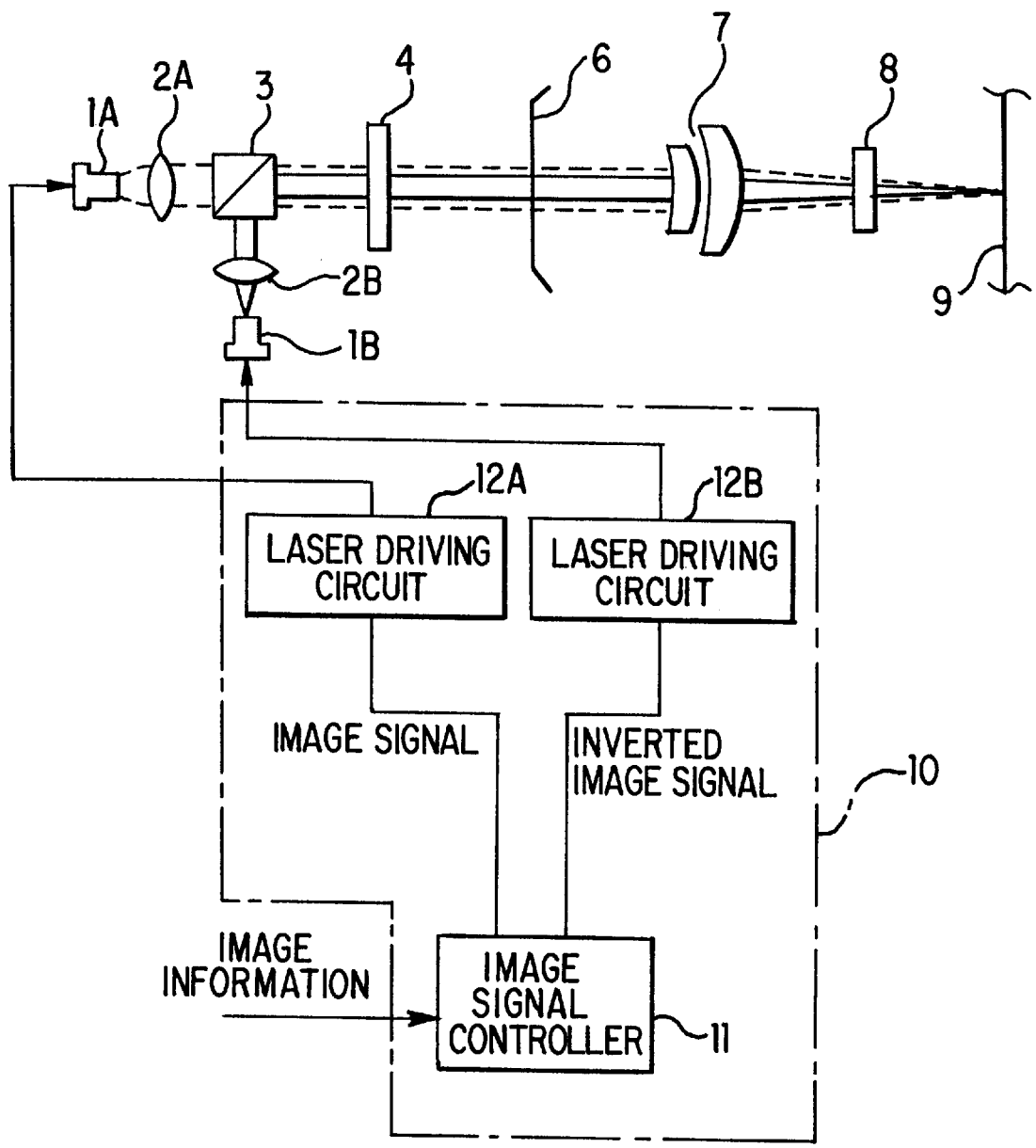
FIG. 2 is an explanatory drawing showing the constitution of an image record controller in the first embodiment.

The image record controller 10 is constituted by an image signal controller 11 for outputting an image signal obtained by processing binary raster data (hereinafter called image data) as image information and an inverted image signal to which this image signal is inverted, a driving circuit 12A for driving the semiconductor laser 1A according to an image signal and a driving circuit 12B for driving the semiconductor laser 1B according to an inverted image signal as shown in FIG. 2.

The driving circuit 12A drives the semiconductor laser 1A so that a beam with the quantity of light enough to deelectrify the electrified photoconductive drum 9 is emitted, the driving circuit 12B drives the semiconductor laser 1B so that a beam with the quantity of light which hardly deelectrifies the electrified photoconductive drum 9 is emitted and the ratio of the emitted quantity of the first and second beams is 5:3.

Figure 3:
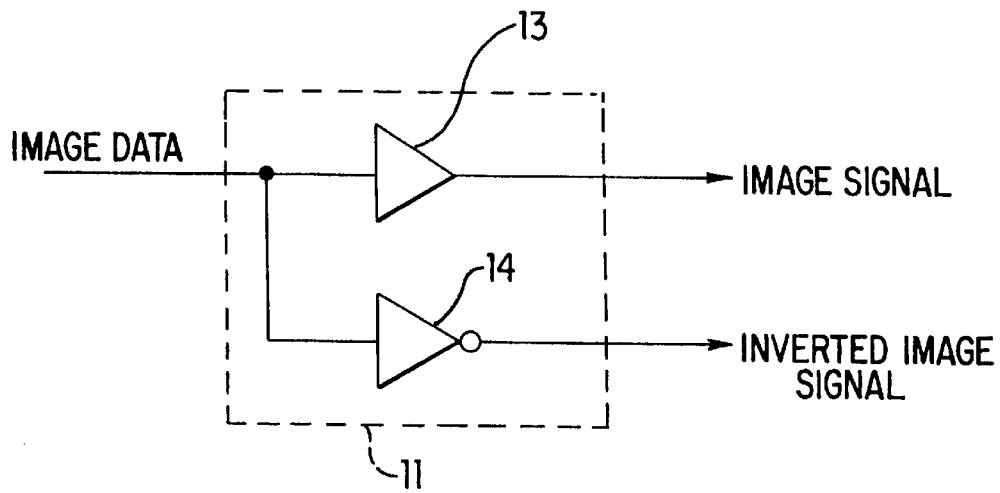
FIG. 3 is an explanatory drawing showing the constitution of an image signal controller in the first embodiment.
Figure 4A:
FIGS. 4(a)–4(c) are timing charts showing the operation of the image signal controller in the first embodiment.
Figure 4B:
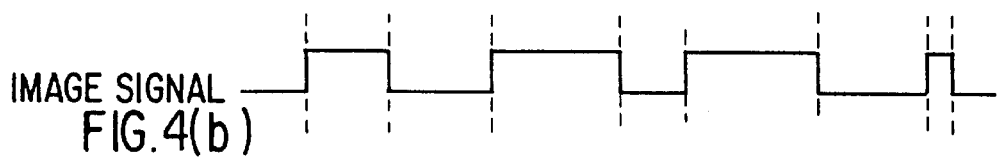
Figure 4C:
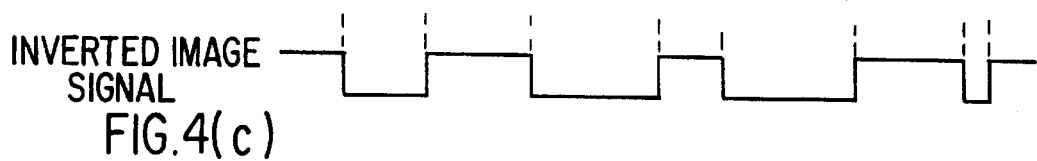

The image signal controller 11 is constituted by an amplifier 13 for amplifying image data and an inverter 14 for inverting image data as shown in FIG. 3 and when image data shown in FIG. 4(a) is input, an image signal shown in FIG. 4(b) is output from the amplifier 13 and an inverted image signal shown in FIG. 4(c) is output from the inverter 14.

An image formation method according to the present invention will be described below referring to FIGS. 5(a) to 5(e).

First, when image data not shown is input from an external host and others by the image signal controller 11 in the image record controller 10, an image signal is output to the laser driving circuit 12A and an inverted image signal is output to the laser driving circuit 12B as shown in FIGS. 5(a) and 5(b) by respectively passing through the amplifier 13 and the inverter 14.

The laser driving circuit 12A drives the semiconductor laser 1A at driving current which can obtain exposure by which the photoconductive drum 9 is completely deelectrified according to an image signal shown in FIG. 5(a) so as to emit the first beam from the semiconductor laser 1A as shown in FIG. 5(c).

In the meantime, the laser driving circuit 12B drives the semiconductor laser 1B at driving current which can obtain exposure by which the photoconductive drum 9 is hardly deelectrified according to an inverted image signal shown in FIG. 5(b) so as to emit the second beam from the semiconductor laser 1B as shown in FIG. 5(d).

The first and second beams emitted from the semiconductor lasers 1A and 1B are reflected and deflected by the polygon mirror 6 through the collimator lenses 2A and 2B, the beam splitter 3, the cylindrical lens 4 and the reflector 5 and scan on the horizontal scanning line of the photoconductive drum 9 through the fθ lens 7 and the cylindrical lens 8.

When the first and second beams scan on the photoconductive drum 9 in the horizontal scanning direction, an exposed image based upon the first beam shown in FIG. 5(c) and an exposed image based upon the second beam shown in FIG. 5(d) are synthesized in a position corresponding to the image formation area of image data on the horizontal scanning line of the photoconductive drum 9 and as a result, a synthesized exposed image shown in FIG. 5(e) is formed.

When the synthesized exposed image formed as described above is compared with an exposed image formed by only the first beam, the gradient of the exposure energy distribution of a contour is sharp and an electrostatic latent image with striking contrast is formed.

Figure 6:
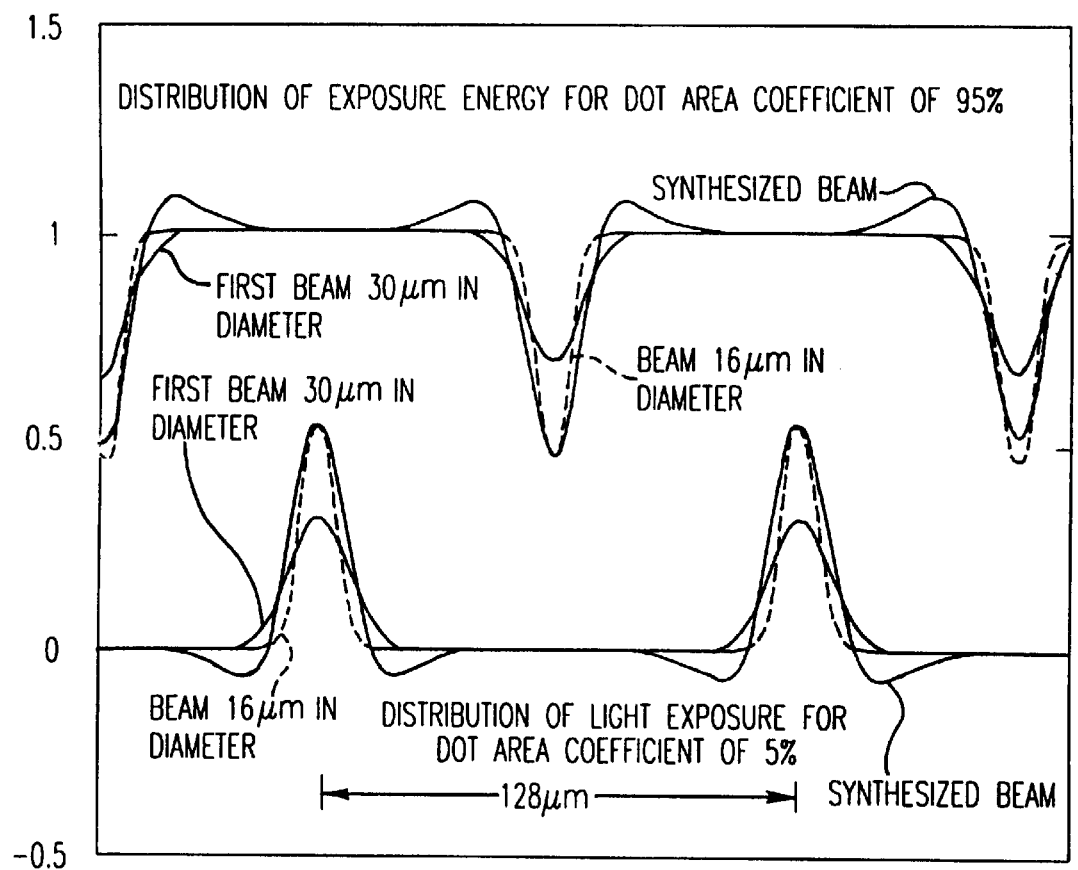
FIG. 6 is an explanatory drawing showing the distribution of exposure for the area coefficient of the dot of an exposed image.

FIG. 6 shows exposure energy distribution for the area coefficient of the dot of an exposed image based upon a beam with the diameter of 16 μm, an exposed image based upon the first beam, that is, a single beam with the diameter of 30 μm and a synthesized exposed image based upon the first and second beams. The exposure energy distribution is expressed by the above expression (1) as described above. In this case, the number of scanning lines on an input screen, that is, a spatial frequency is 200 line/inch (lpi) and the area coefficient of an input dot is 5% and 95%.

For the exposure energy distribution of an exposed image obtained by only the first beam, when the area coefficient of a dot is 5% if an exposure level in lighting continuously is '1', the maximum value is approximately 0.33, when the area coefficient of a dot is 95%, the minimum value is approximately 0.66 and even if developing bias is set to any level, satisfactory reproduction is impossible in the range of the area coefficient of a dot of 5% to 95%. In the meantime, for the exposure energy distribution of an exposed image obtained by the first and second beams, when the area coefficient of a dot is 5%, the maximum value is approximately 0.54, when the area coefficient of a dot is 95%, the minimum value is approximately 0.46 and if developing bias is in this range, gradation can be satisfactorily reproduced in the range of the area coefficient of a dot of 5% to 95%. For exposure energy distribution of an exposed image obtained by a beam with the diameter of 16 μm, when the area coefficient of a dot is 5%, the maximum value is approximately 0.54 and when the area coefficient of a dot is 95%, the minimum value is approximately 0.46. This shows performance when a beam with the diameter of 16 μm is used in an imaging optical system of 30 μm in this embodiment is realized. Therefore, an exposed image with striking contrast on the photosensitive material can be formed without reducing the diameter of a beam.

When an exposed image (an electrostatic latent image) is formed on the photoconductive drum 9 as described above, it is developed using toner by the developing machine not shown, afterward, the toner image is transferred on a recording medium, further the image transferred on the recording medium is fixed and image formation is completed. At this time, as an exposed image with striking contrast is formed on the photoconductive drum 9 as described above, a high definition and high quality image can be reproduced on a recording medium.

In the above embodiment, the second beam based upon an inverted image signal is emitted to the entire image formation area, however, it may be emitted to only a local area in the contour of an image. In this embodiment, a noteworthy frequency band may be emphasized or limited by making the most of the freedom of parameters such as the diameter and the ratio of the quantity of light of the first and second beams.

Figure 7:
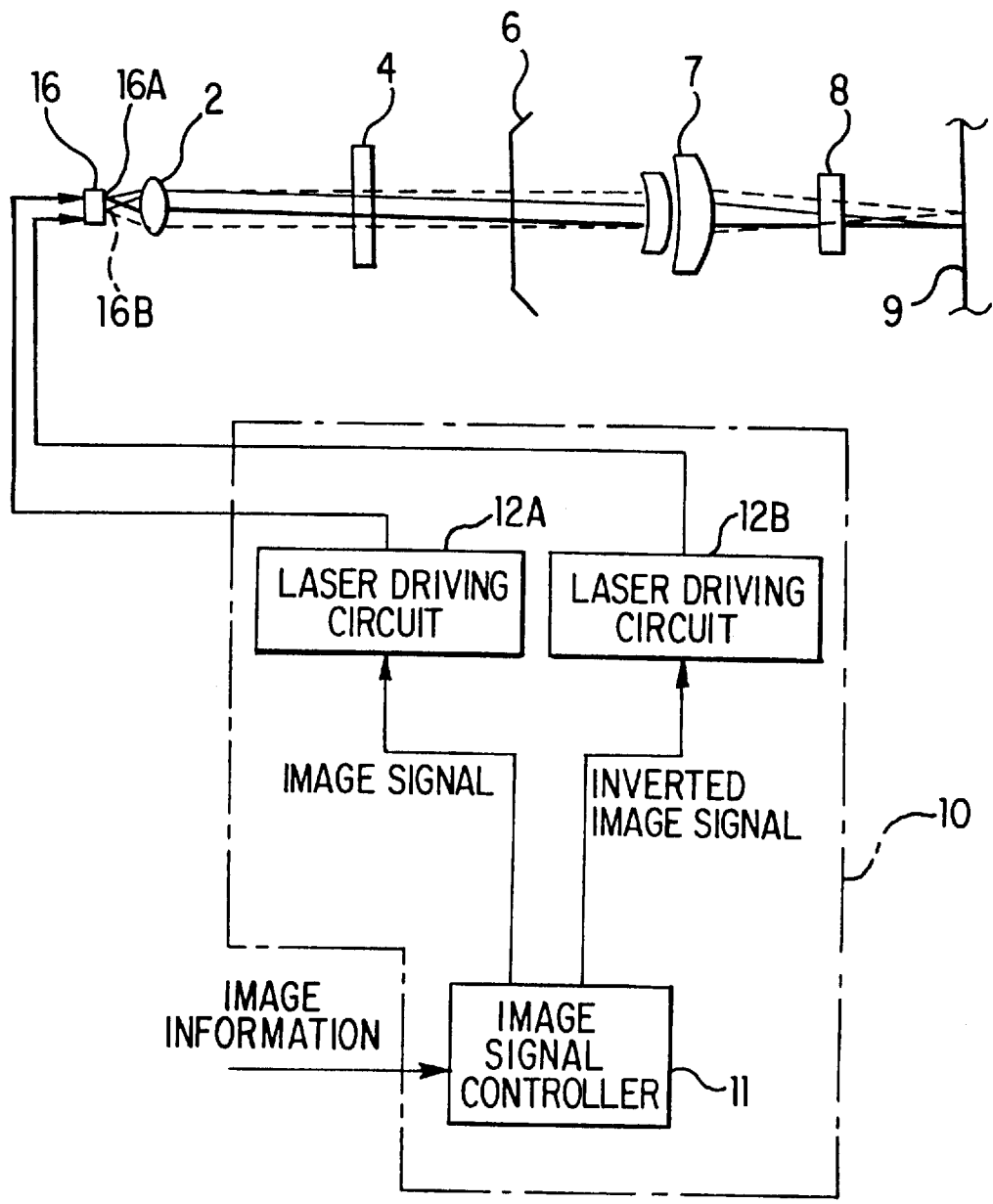
FIG. 7 is an explanatory drawing showing a second embodiment according to the present invention.

FIG. 7 shows the constitution of an image formation apparatus equivalent to a second embodiment according to the present invention. As in FIG. 7, the same reference number and sign are allocated to the same portion as in FIG. 2, description of them will be omitted.

This image formation apparatus is constituted by a semiconductor laser 16 which emits first and second beams different in a spreading angle which are modulated according to an image signal and an inverted image signal from oscillation areas 16A and 16B separated by a predetermined interval in the horizontal scanning direction, a collimator lens 2 for converting the first and second beams emitted from the semiconductor laser 16 to parallel beams and an image record controller 10 for inputting image information from an external host and the others and controlling the semiconductor laser 16, and is constituted so that the first and second beams emitted from the semiconductor laser 16 form an image on a photoconductive drum 9 at an interval determined by the lateral magnification of an optical system in the horizontal scanning direction.

Figure 8:
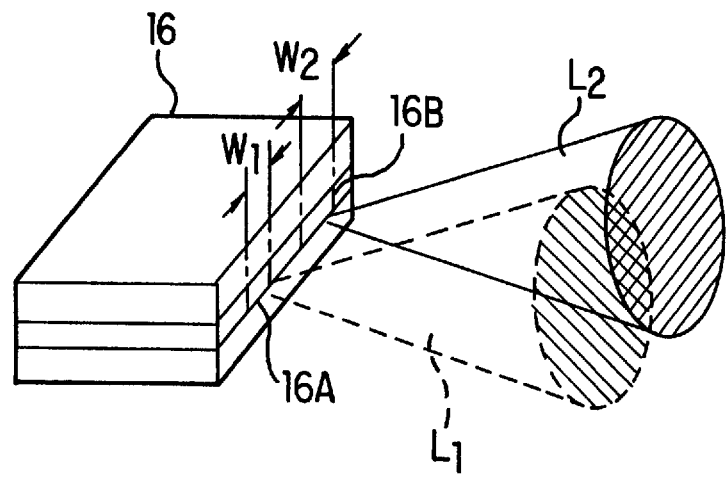
FIG. 8 is an explanatory drawing showing a semiconductor laser in the second embodiment.
Figure 9:
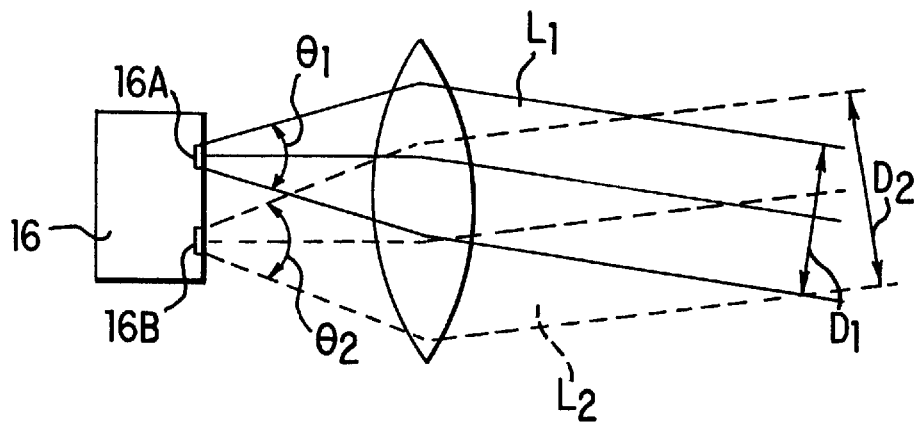
FIG. 9 is an explanatory drawing showing the semiconductor laser in the second embodiment.

The semiconductor laser 16 is provided with an oscillation area 16A with the width of an opening of W1 and an oscillation area 16B with the width of an opening of W2 narrower than the width of an opening W1 as shown in FIGS. 8 and 9 and emits first and second beams $L_1$ and $L_2$ respectively with spreading angles $\theta_1$ and $\theta_2$ ($\theta_1 < \theta_2$) from the oscillation areas 16A and 16B. That is, the semiconductor laser is constituted so that parallel first and second beams respectively with the diameter of $D_1$ and $D_2$ ($D_1 < D_2$) can be obtained from the collimator lens 2.

The image record controller 10 generates an image signal and an inverted image signal based upon image information (image data), instructs the semiconductor laser 16 to emit a first beam with the quantity of light enough to deelectrify the photoconductive drum 9 from the oscillation area 16A according to an image signal, instructs the semiconductor laser 16 to emit a second beam with the quantity of light which hardly deelectrify the photoconductive drum 9 from the oscillation area 16B according to an inverted image signal and controls the timing of emission of one of the oscillation areas of the semiconductor laser 16 so that an image exposed by the first beam and an image exposed by the second beam are synthesized on the photoconductive drum 9 by correcting an interval between spots where images are formed by the first and second beams.

According to the image formation apparatus constituted as described above, the gradient of the exposure energy distribution of the contour of an exposed image formed on the photoconductive drum 9 is also sharp and an electrostatic latent image with striking contrast can be also obtained.

Figure 10:
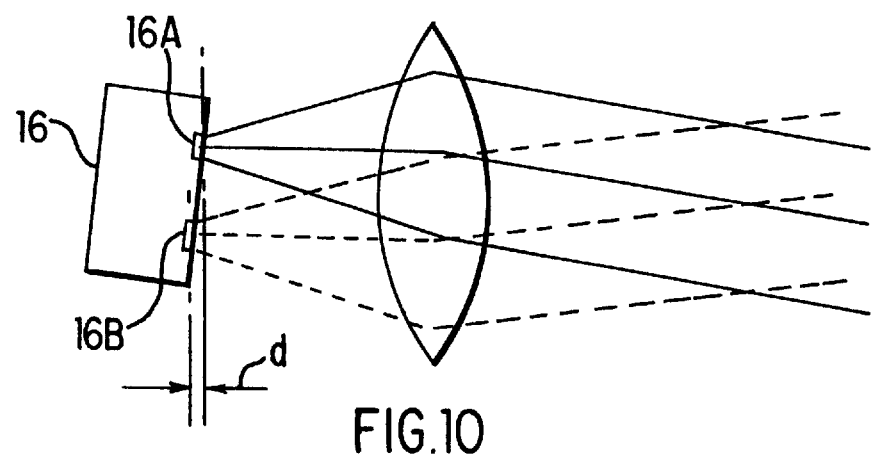
FIG. 10 is an explanatory drawing showing a third embodiment according to the present invention.

FIG. 10 shows a semiconductor laser 16 in an image formation apparatus equivalent to a third embodiment according to the present invention. In this embodiment, the semiconductor laser 16 provided with oscillation areas 16A and 16B which emit beams equal in a spreading angle as in the second embodiment is also used and the semiconductor laser 16 is arranged obliquely in the direction perpendicular to an optical axis, that is, so that the oscillation area 16A is located in the focal position of a collimator lens 2 and the oscillation area 16B is located before or after the focal position by distance d. In such constitution, if the longitudinal magnification of an optical system is α, dislocation between imaged positions on an imaged face, that is, on the photoconductive drum 9 is d·α and the diameter of the second beam on the photoconductive drum 9 is extended.

Figure 11:
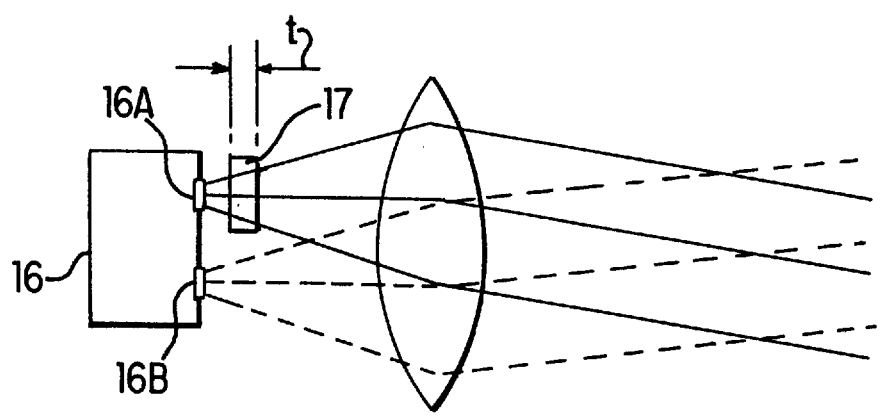
FIG. 11 is an explanatory drawing showing a fourth embodiment according to the present invention.

FIG. 11 shows a semiconductor laser 16 in an image formation apparatus equivalent to a fourth embodiment according to the present invention. In this embodiment, a semiconductor laser 16 provided with oscillation areas 16A and 16B which emit beams equal in a spreading angle as in the second embodiment is also used and is constituted so that the focal position of the second beam is changed by inserting a plane parallel plate 17 in a area in which beams from the oscillation area 16B are not crossed on an optical path from the oscillation area 16B to a collimator lens 2 so as to defocus the second beam. In such constitution, if the thickness of a plane parallel plate 17 is t and a refractive index is n, dislocation d from the focal face of the oscillation area 16B is "d=t·(n−1)" and if the longitudinal magnification of an optical system is α, the dislocation of an imaged position on an imaged face, that is, on a photoconductive drum 9 is d·α and the diameter of the second beam on the photoconductive drum 9 is extended.

FIG. 12 shows the constitution of an image signal controller 11 in an image formation apparatus equivalent to a fifth embodiment according to the present invention. In this embodiment, an optical system is designed so that first and second beams emitted from the semiconductor lasers 1A and 1B as in the first embodiment are equal in beam diameter on a photoconductive drum and the semiconductor laser 1B is modulated by an enlarged inverted image signal generated by enlarging and inverting an image signal.

The image signal controller 11 is constituted by a delay element 18A for generating an image signal and image data A by delaying image data, a delay element 18B for generating image data B by delaying image data A and a NAND circuit 19 for generating an enlarged inverted signal based upon the image data and the image data B and when image data shown in FIG. 13(*a*) is input, image data A shown in FIG. 13(*b*) and an image signal shown in FIG. 13(*d*) are output from the delay element 18A, image data B shown in FIG. 13(*c*) is output from the delay element 18B and an enlarged inverted image signal shown in FIG. 13(*e*) is output from the NAND circuit 19.

In such constitution, when an image signal shown in FIG. 14(*a*) and an enlarged inverted image signal shown in FIG.

14(b) are output from the image signal controller 11, a synthesized exposed image shown in FIG. 14(e) generated by synthesizing an image exposed by the first beam shown in FIG. 14(c) and an image exposed by the second beam shown in FIG. 14(d) is formed in a position corresponding to an image formation area of image data on a horizontal scanning line on the photoconductive drum 9. Therefore, the same effect as in the first embodiment can be obtained.

Figure 15:
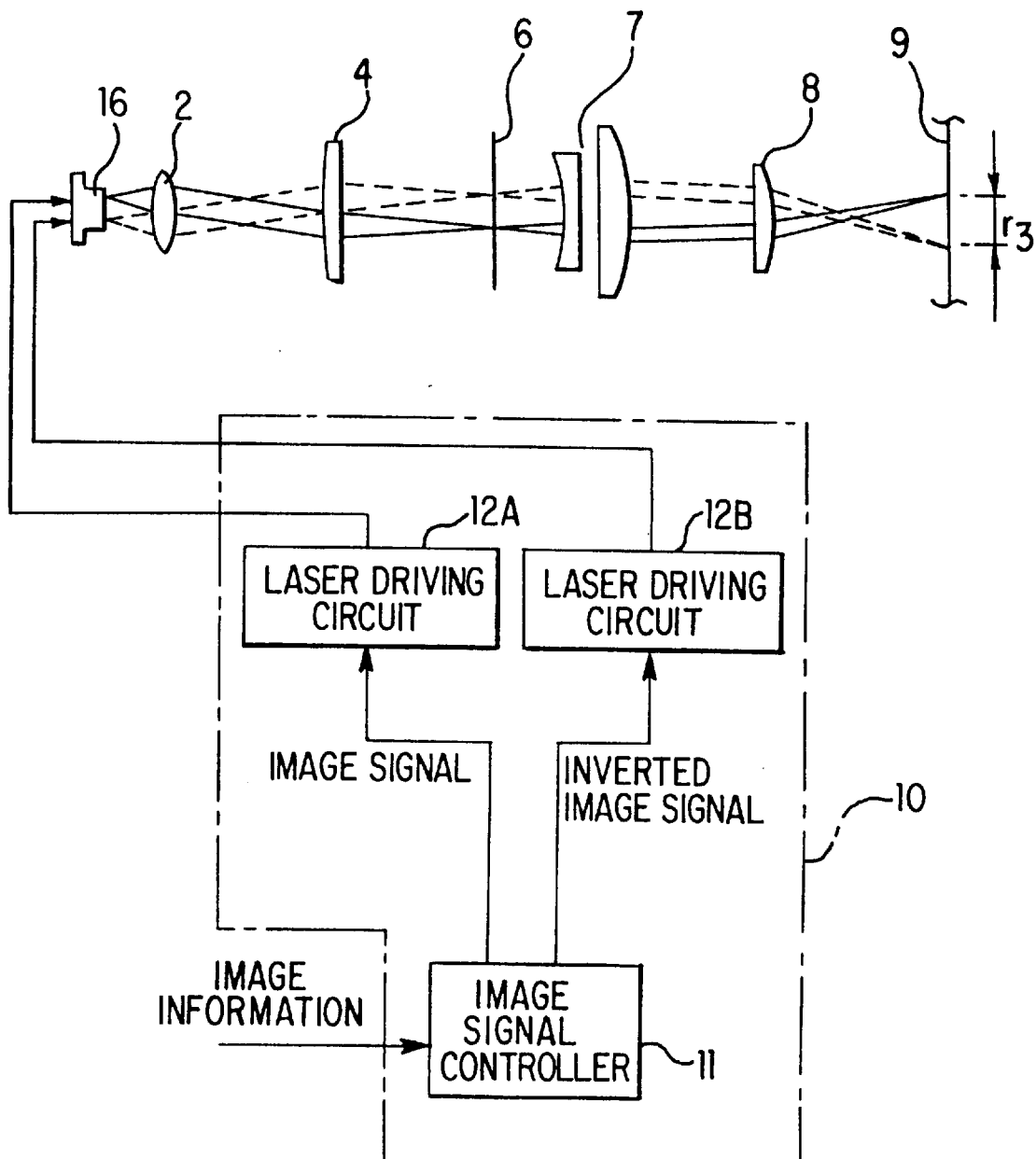
FIG. 15 is an explanatory drawing showing a sixth embodiment according to the present invention.

FIG. 15 shows the constitution of an image formation apparatus equivalent to a sixth embodiment according to the present invention. In this embodiment, a semiconductor laser 16 provided with oscillation areas which emit first and second beams equal in a spreading angle as in the second embodiment is arranged so that its oscillation areas are arrayed in the vertical scanning direction so as to focus the first and second beams on the photoconductive drum 9 off by distance $r_3$ in the vertical scanning direction and the second beam is modulated according to an enlarged inverted signal generated by enlarging and inverting an image signal. The distance $r_3$ is distance between beams shown by beam stops on the photoconductive drum 9 and in this embodiment, it is set to ½ or "n+½" (n: natural number) of vertical scanning pitch. Exposure by the second beam is performed in the range of the quantity of light corresponding to the total quantity of exposure by the adjacent first beam on a horizontal scanning line.

Figure 16:
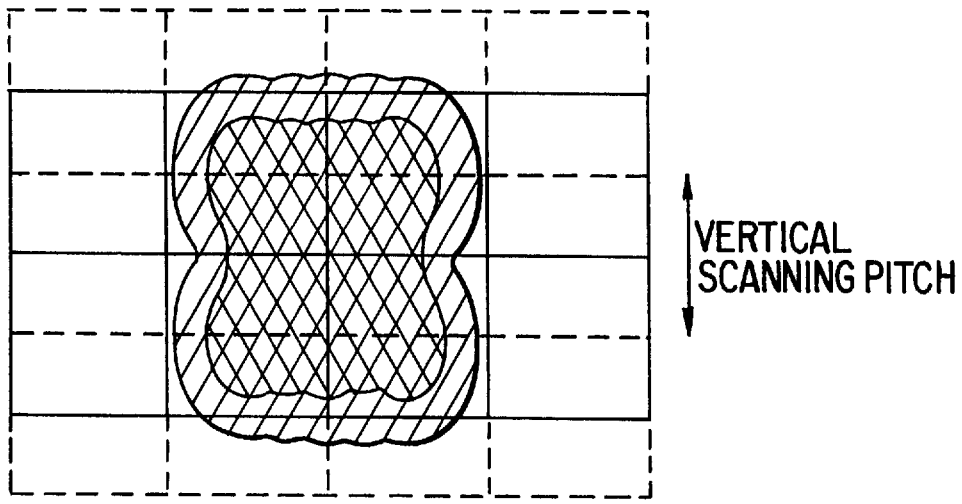
FIG. 16 is an explanatory drawing showing an exposed image based upon a first beam in the sixth embodiment.

If an image is formed in four pixels for an example of image data, four pixels are exposed by the first beam according to an image signal and an exposed image shown in FIG. 16 is formed on the photoconductive drum 9. In the meantime, a position off by ½ pitch from the first beam in the vertical scanning direction is exposed by the second beam according to an enlarged inverted image signal and an exposed image shown in FIG. 17 is formed on the photoconductive drum 9.

Figure 17:
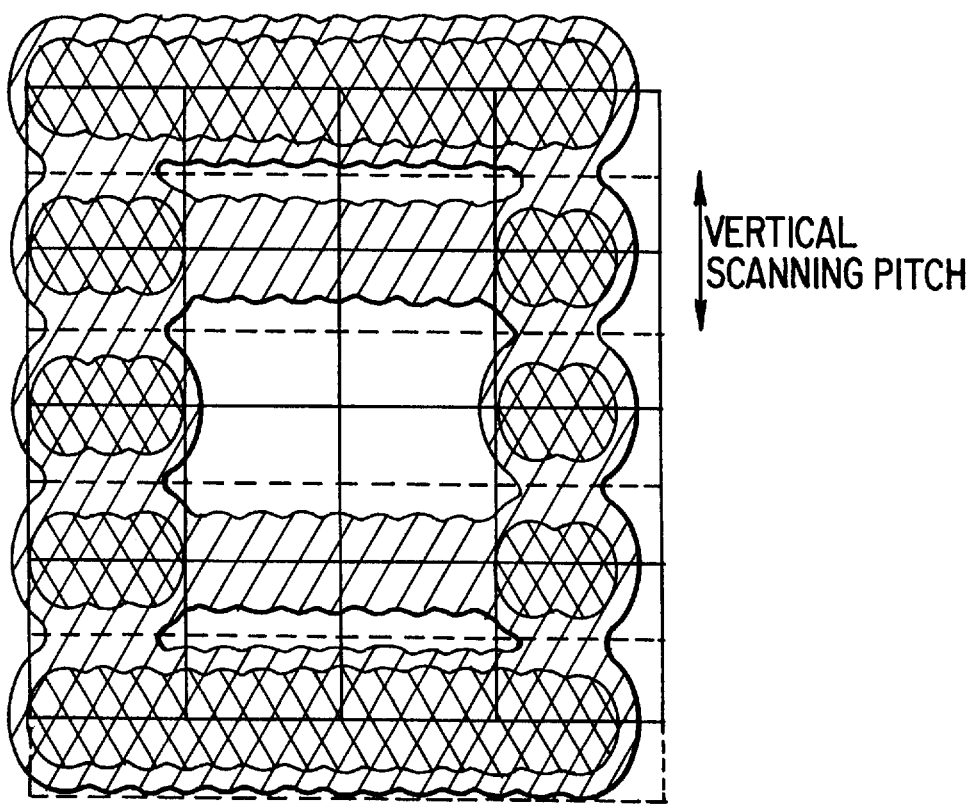
FIG. 17 is an explanatory drawing showing an exposed image based upon a second beam in the sixth embodiment.
Figures 18, 19A, 19B:
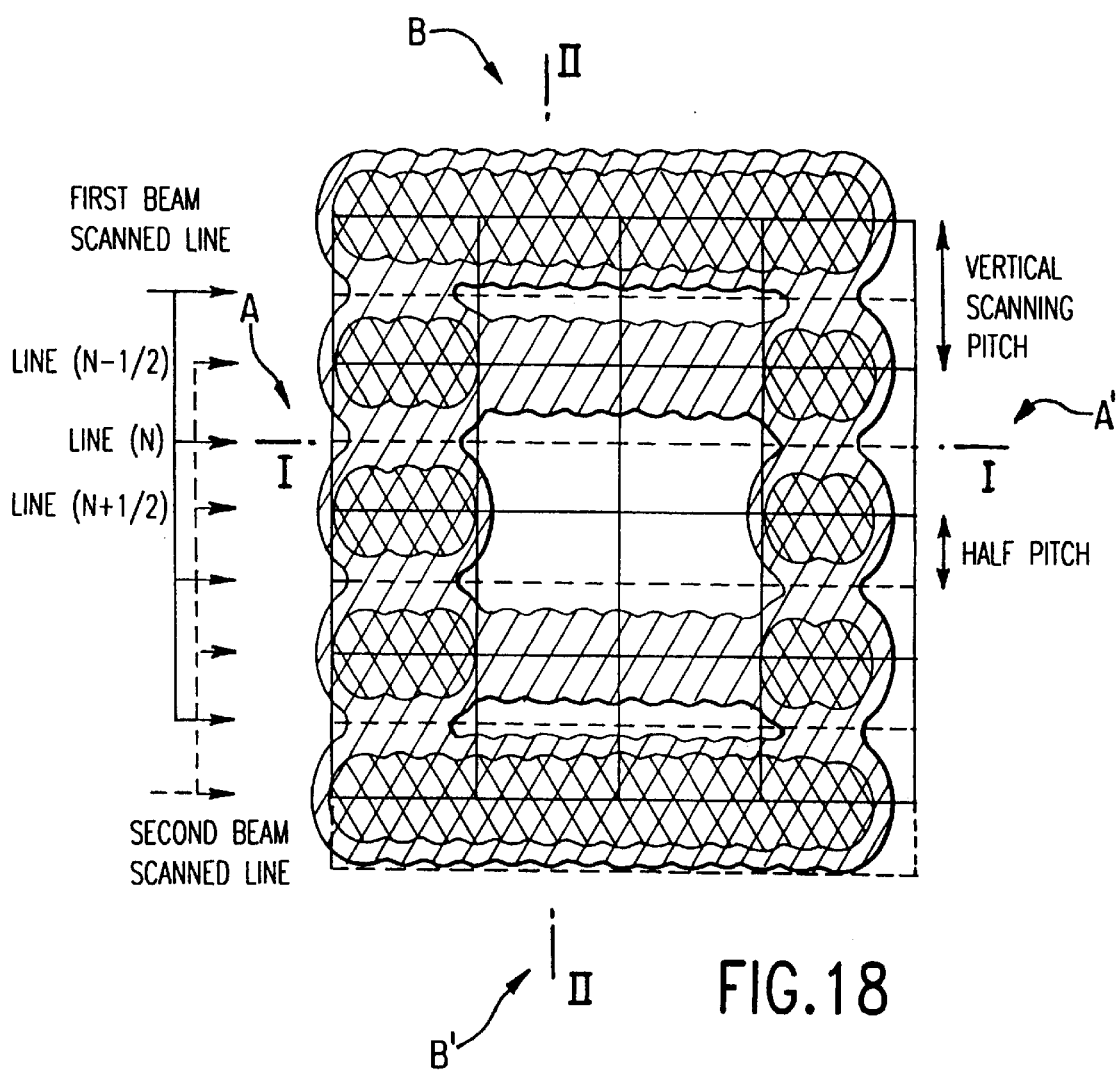
FIG. 18 is an explanatory drawing showing a synthesized expose image in the sixth embodiment.
FIGS. 19(a) and 19(b) are explanatory drawings showing an enlarged inverted image signal on a horizontal scanning line (N–½ line) by a second beam adjacent to a line A–A' in FIG. 18 and an exposure pattern.

FIG. 18 is made by putting the center of FIG. 16 on that of FIG. 17 and therefore, the photoconductive drum 9 has an exposed image in a shape in which the center of FIG. 16 is put on that of FIG. 17. The distribution of exposure on a line A–A' in FIG. 18 equivalent to a horizontal scanning line (line N) by the first beam is based upon the synthesis of an exposure pattern by the second beam modulated by an enlarged inverted image signal on a line "N–½" shown in FIGS. 19(a) and 19(b), an exposure pattern by the first beam modulated by an image signal on the line N shown in FIGS. 20(a) and 20(b) and an exposure pattern by the second beam modulated by an enlarged inverted image signal on a line "N+½" shown in FIGS. 21(a) and 21(b). FIG. 22 shows a synthesized exposed image formed by such synthesis of the exposure patterns and an exposed image with a sharp gradient in its contour is realized.

Figure 23A:
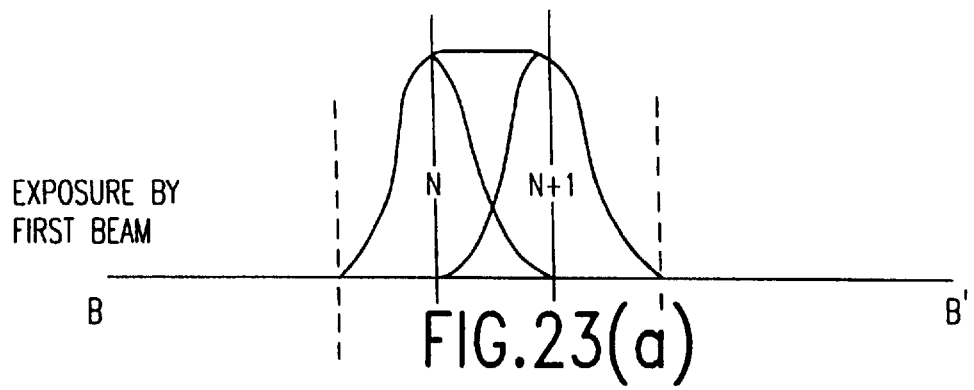
FIGS. 23(a)–23(c) are explanatory drawings showing the distribution of exposure on a section viewed along a line B–B' FIG. 18.
Figure 23B:
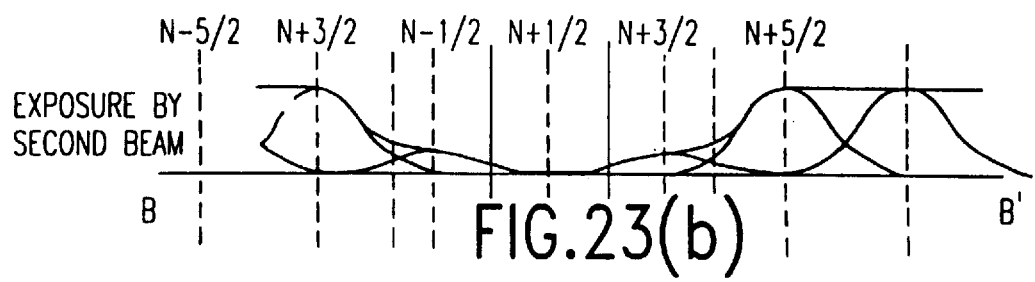
Figure 23C:
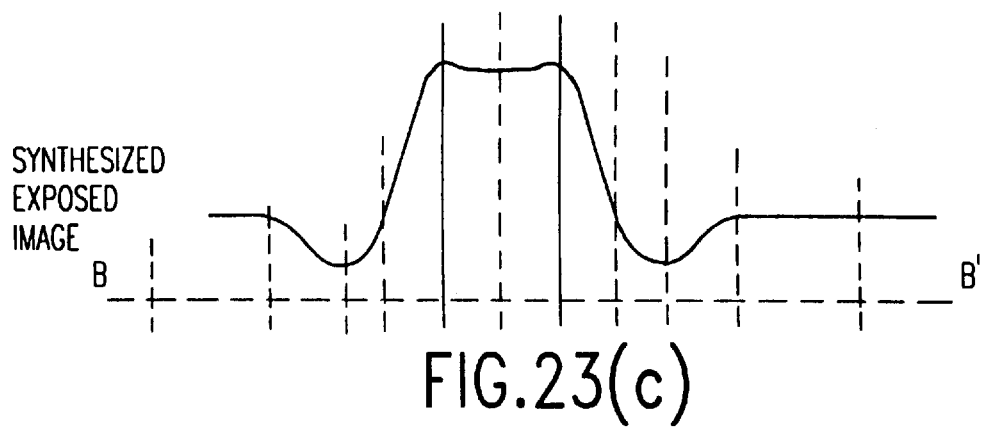
Figure 24A:
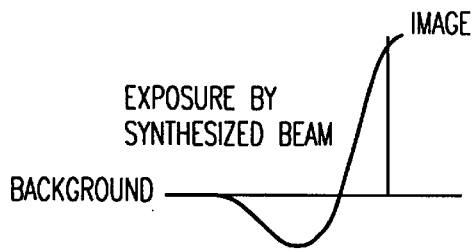
FIGS. 24(a) and 24(b) are explanatory drawings showing the contour of an exposed image in the vertical scanning direction by synthesized exposure in the sixth embodiment and the contour of an exposed image in the vertical scanning direction when an image is exposed to a single beam.
Figure 24B:
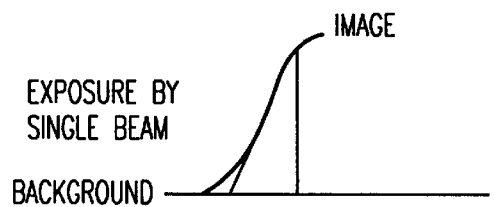

In a scanning optical system in which a plurality of beams are arranged off by vertical scanning pitch as in this embodiment, an exposed image with striking contrast can be also obtained in the vertical scanning direction by controlling the quantity of light of the second beam. FIGS. 23(a) to 23(c) show the distribution of exposure on a section viewed along a line B–B' in FIG. 18. The first beam exposes pixels on the lines N and N+1, exposes pixels on the lines "N–½" and "N+½" outside the lines and in the vicinity of them in extremely little quantity, exposes lines further outside the lines in predetermined bias exposure and an exposed image with a sharp gradient in its contour in the vertical scanning direction can be obtained. In an example shown in FIG. 23, the normal bias luminous energy of the second beam is set to approximately 0.4 for the quantity of emitted light of the first beam of 1 and edge bias luminous energy in a portion adjacent to an image is set to approximately 0.1. FIG. 24(a) shows the contour of an image exposed by synthesized exposure, FIG. 24(b) shows the contour of an image exposed by a single beam and for beam diameter and difference in exposure between a background and an image, the same condition is set. As described above, an exposed image with striking contrast can be also obtained in the vertical scanning direction.

Figure 25:
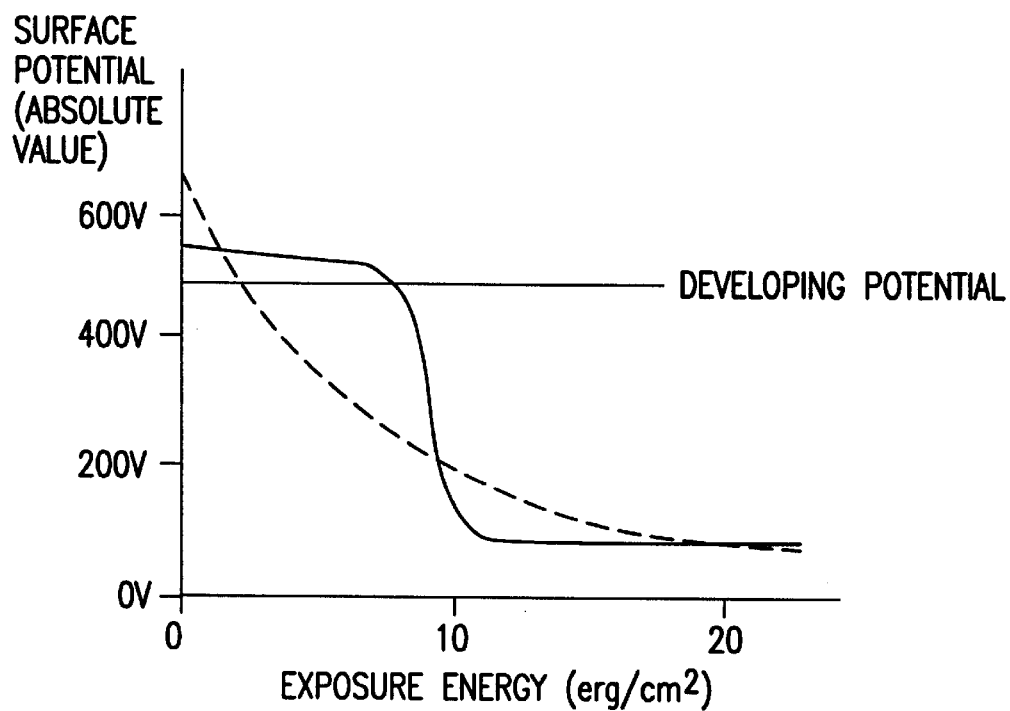
FIG. 25 is a graph showing the sensitivity characteristic of a high gamma photosensitive material in a seventh embodiment.
Figure 26A:
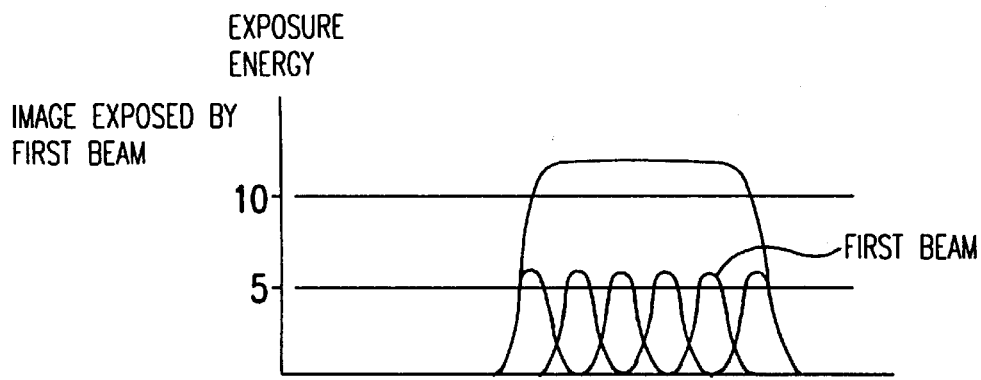
FIGS. 26(a)–26(c) are explanatory drawings showing the relationship between the waveform of a signal showing operation in the seventh embodiment and an exposed image.
Figure 26B:
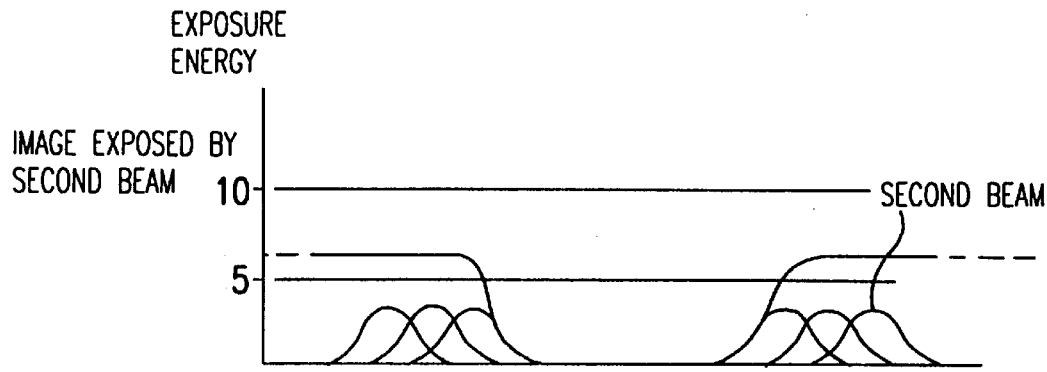
Figure 26C:
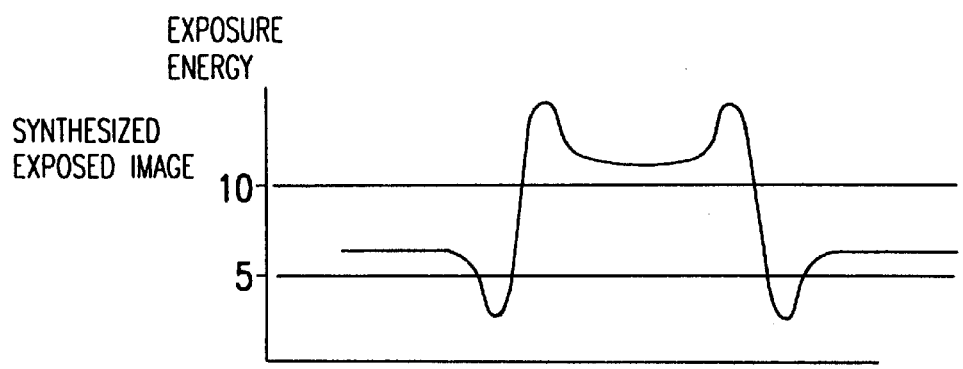

For a photoconductive drum 9 in the above embodiments, if so-called high gamma photosensitive material which is hardly deelectrified as far as predetermined exposure energy and sharply starts to be deelectrified when exposure energy exceeds a predetermined value is used, further higher effect can be obtained. When a general photosensitive material is electrified up to 600 V or more as shown by a dotted line in FIG. 25 and is exposed, its potential falls up to approximately 100 V in the case of overall irradiation and the rate of the fall of potential depends upon the magnitude of exposure energy. Developing potential is set to approximately 500 V and development is performed in an area lower than 500 V in potential. However, around 500 V set as developing potential, the fluctuation of potential is larger, compared with that of exposure and in an area in which exposure energy is low, the fluctuation of luminous energy has a great effect upon an output image. However, in the case of high gamma photosensitive material, as shown by a full line in FIG. 25, an area of 0 to 7 erg/cm² is a dead zone for exposure energy, in an area of 7 to 11 erg/cm², potential rapidly falls and when exposure energy exceeds 11 erg/cm², the high gamma photosensitive material is substantially completely deelectrified. If photosensitive material provided with such a sensitivity characteristic is used, binary image reproduction which is not influenced by unevenness in electrified potential is enabled. In the meantime, as in an edge area of an exposed image, exposure energy varies serially, striking noise is generated in the area of a reproduced image in an exposed image with dull edges. Therefore, if an exposed image with striking contrast is formed by a method according to the above embodiment, in view of the characteristics of the high gamma photosensitive material, in the case of a bias beam (second beam), the exposure pattern of the inverted image of a predetermined image is formed at exposure energy of 7 erg/cm² or less and in the case of a main beam (first beam), the exposure pattern of a predetermined image is formed at exposure energy of 11 erg/cm² or more. FIGS. 26(a) to 26(c) show this relationship. According to this embodiment, an exposed image suitable for the high gamma photosensitive material is supplied and not only a high quality image can be obtained but the freedom in respectively setting the quantity of the main beam and the bias beam is increased and synergistic effect can be obtained.

As described above, according to the image formation method and the image formation apparatus according to the present invention, as a first beam modulated according to an image signal and a second beam which is modulated according to an inverted image signal to which an image signal is inverted and is provided with the effect of deelectrification smaller than the first beam are synthesized on a photosensitive material, an exposed image with striking contrast can be formed on the photosensitive material and a high definition and high quality image can be formed.

What is claimed is:

1. An image formation method comprising the step of:
   outputting an image signal generated by processing image information and an inverted image signal generated by inverting said image signal;

emitting a first beam with predetermined luminous intensity modulated according to said image signal and a second beam with luminous intensity smaller than said predetermined luminous intensity modulated according to said inverted image signal;

synthesizing said first beam and said second beam to generate a synthesized beam; and forming an electrostatic latent image on photosensitive material by scanning said synthesized beam in a horizontal scanning direction on said photosensitive material moved in a vertical scanning direction.

2. An image formation method according to claim 1, further comprising the step of controlling a diameter of said first beam on said photosensitive material so that said diameter of said first beam is smaller than a diameter of said second beam on said photosensitive material.

3. An image formation method according to claim 1, further comprising the step of emitting said first beam and said second beam from a semiconductor laser array provided with first and second oscillation areas which emit two beams different in a spreading angle.

4. An image formation method according to claim 1, further comprising the step of emitting said first beam and said second beam from a semiconductor laser array provided with first and second oscillation areas which emit two beams equal in a spreading angle and arranged so that optical distance between said first and second oscillation areas and said photosensitive material is respectively different.

5. An image formation method according to claim 1, further comprising the step of emitting said first beam and said second beam from a semiconductor laser array provided with first and second oscillation areas which emit two beams equal in a spreading angle, and one of said two beams equal in a spreading angle is defocused.

6. An image formation method according to claim 1, further comprising the step of decreasing an amplitude of said inverted image signal before an amplitude of said image signal increases, and the step of increasing the amplitude of said inverted image signal after the amplitude of said image signal decreases.

7. An image formation method according to claim 1, further comprising the step of emitting said first beam in the quantity of light in which development can be performed on said photosensitive material, and the step of emitting said second beam in the quantity of light in which development is not performed on said photosensitive material.

8. An image formation method comprising the steps of:

outputting an image signal generated by processing image information and an inverted image signal generated by inverting said image signal;

emitting a first beam with predetermined luminous intensity modulated according to said image signal and a second beam with luminous intensity smaller than said predetermined luminous intensity modulated according to said inverted image signal at respective predetermined timing so that an imaged point is equal; and forming an electrostatic latent image on photosensitive material by scanning said first and second beams in the horizontal scanning direction on said photosensitive material moved in the vertical scanning direction.

9. An image formation method according to claim 8, further comprising the step of controlling a diameter of said first beam on said photosensitive material so that said diameter of said first beam is smaller than a diameter of said second beam on said photosensitive material.

10. An image formation method according to claim 8, further comprising the step of emitting said first beam and said second beam from a semiconductor laser array provided with first and second oscillation areas which emit two beams different in a spreading angle.

11. An image formation method according to claim 8, further comprising the step of emitting said first beam and said second beam from a semiconductor laser array provided with first and second oscillation areas which emit two beams equal in a spreading angle and arranged so that optical distance between said first and second oscillation areas and said photosensitive material is respectively different.

12. An image formation method according to claim 8, further comprising the step of emitting; said first beam and said second beam from a semiconductor laser array provided with first and second oscillation areas which emit two beams equal in a spreading angle, and one of said two beams equal in a spreading angle is defocused.

13. An image formation method according to claim 8, further comprising the step of emitting an amplitude of said inverted image signal before an amplitude of said image signal increases, and the step of increasing the amplitude of said inverted image signal after the amplitude of said image signal decreases.

14. An image formation method according to claim 8, further comprising the step of emitting said first beam and said second beam so that imaged points on said photosensitive material are off by predetermined distance in a vertical scanning direction.

15. An image formation method according to claim 8, further comprising the step of emitting said first beam in the quantity of light in which development can be performed on said photosensitive material, and the step of emitting said second beam in the quantity of light in which development is not performed on said photosensitive material.

16. An image formation apparatus comprising:

signal generating means for generating an image signal obtained by processing image information and an inverted image signal obtained by inverting this image signal;

a first light source for emitting a first beam with predetermined luminous intensity modulated according to said image signal;

a second light source for emitting a second beam with luminous intensity smaller than said predetermined luminous intensity modulated according to said inverted image signal;

synthesizing means for synthesizing said first beam and said second beam;

scanning means for scanning a synthesized beam synthesized by said synthesizing means in the horizontal scanning direction;

photosensitive material for receiving the exposure of said synthesized beam, being moved in the vertical scanning direction and forming an electrostatic latent image; and control means for controlling a timing of emission of first said light source and said second light source.

17. An image formation apparatus according to claim 16, wherein a diameter of said first beam on said photosensitive material is controlled so that said diameter of first beam is smaller than a diameter of said second beam on said photosensitive material.

18. An image formation apparatus according to claim 16, wherein said first light source and said second light source are a semiconductor laser array which emits beams different in a spreading angle from corresponding first and second oscillation areas.

19. An image formation apparatus according to claim 16, wherein said first and second light sources are a semiconductor laser array which emits two beams equal in a spreading angle from corresponding first and second oscillation areas, and said semiconductor laser array is arranged so that optical distance between said first and second oscillation areas and said photosensitive material is respectively different.

20. An image formation apparatus according to claim 16, wherein said first and second light sources are constituted by a semiconductor laser array which emits two beams equal in a spreading angle from corresponding first and second oscillation areas and optical means for defocusing one of said two beams equal in a spreading angle on said photosensitive material.

21. An image formation apparatus according to claim 16, wherein said signal generating means generates said inverted image signal by decreasing an amplitude of the inverted image signal before increasing an amplitude of said image signal, and increasing the amplitude of the inverted image signal after decreasing the amplitude of said image signal.

22. An image formation apparatus according to claim 16, wherein a surface potential of said photosensitive material is maintained so that the photosensitive material is developing potential or more even if said photosensitive material receives said second beam, and said photosensitive material is provided with a photosensitive characteristic that said photosensitive material is substantially completely deelectrified when the photosensitive material receives said first beam.

23. An image formation apparatus comprising:
signal generating means for generating an image signal obtained by processing image information and an inverted image signal obtained by inverting said image signal;
a first light source for emitting a first beam with predetermined luminous intensity modulated according to said image signal;
a second light source for emitting a second beam with luminous intensity smaller than said predetermined luminous intensity modulated according to said inverted image signal;
scanning means for scanning said first beam and said second beam emitted from said first light source and said second light source in a horizontal scanning direction;
photosensitive material for receiving the exposure of said first beam and said second beam, being moved in a vertical scanning direction and forming an electrostatic latent image; and
control means for controlling a timing of emission of said first light source and said second light source so that said first beam emitted from said first light source and said second beam emitted from said second light source are synthesized on an imaged face of said photosensitive material.

24. An image formation apparatus according to claim 23, wherein a diameter of said first beam on said photosensitive material is controlled so that said diameter of said first beam is smaller than a diameter of said second beam on said photosensitive material.

25. An image formation apparatus according to claim 23, wherein said first light source and said second light source are a semiconductor laser array which emits beams different in a spreading angle from corresponding first and second oscillation areas.

26. An image formation apparatus according to claim 23, wherein said first light source and said second light source are a semiconductor laser array which emits two beams equal in a spreading angle from corresponding first and second oscillation areas, and said semiconductor laser array is arranged so that optical distance between said first and second oscillation areas and said photosensitive material is respectively different.

27. An image formation apparatus according to claim 23, wherein said first light source and said second light sources are constituted by a semiconductor laser array which emits two beams equal in a spreading angle from corresponding first and second oscillation areas and optical means for defocusing one of said two beams equal in a spreading angle.

28. An image formation apparatus according to claim 23, wherein said signal generating means generates said inverted image signal by decreasing an amplitude of the inverted image signal before increasing an amplitude of said image signal, and increasing the amplitude of the inverted image signal after decreasing the amplitude of said image signal.

29. An image formation apparatus according to claim 23, wherein said first and second light sources, said scanning means, said photosensitive material are arranged so that said first and second beams form an image separated by a predetermined distance in the vertical scanning direction on said photosensitive material.

30. An image formation apparatus according to claim 23, wherein a surface potential of said photosensitive material is maintained so that the photosensitive material is developing potential or more even if said photosensitive material receives said second beam, and said photosensitive material is provided with a photosensitive characteristic that said photosensitive material is substantially completely deelectrified when the photosensitive material receives said first beam.

31. An image formation apparatus for writing image information to photosensitive material by scanning a beam every line in another direction perpendicular to a direction in which said photosensitive material is moved, comprising:
an image writing light source provided with beam diameter for providing resolution specified in said image information to said photosensitive material for writing said image information;
first beam driving means for providing a modulated signal according to said image information to said image writing light source;
an image correcting light source provided with beam diameter larger than that of said image writing light source and with luminous intensity weaker than that of a luminous flux of said image writing light source;
second beam driving means for providing an inverted signal with reverse luminous intensity to that of a modulated signal according to said image information and to said image correcting light source periodically;
synthesizing means for synthesizing the luminous flux of said image writing light source and that of said image correcting light source;
a rotary polygon mirror for scanning said photosensitive material in said another direction by said synthesized luminous flux;
an optical system for leading said synthesized luminous flux to said photosensitive material via said rotary polygon mirror; and
a control unit connected to said first beam driving means and said second beam driving means for adjusting a period and phase of the luminous flux of said image correcting light source to a period and phase of said modulated signal of said image writing light source.

32. An image formation apparatus for writing image information to photosensitive material by scanning a beam every line in another direction perpendicular to a direction in which said photosensitive material is moved, comprising:

an image writing light source provided with beam diameter for providing resolution specified in said image information to said photosensitive material for writing said image information;

first beam driving means for providing a modulated signal according to said image information to said image writing light source;

an image correcting light source provided with a beam profile duller than that of said image writing light source and with luminous intensity weaker than that of a luminous flux of said image writing light source;

second beam driving means for providing an inverted signal with reverse luminous intensity to that of a modulated signal according to said image information and to said image correcting light source periodically;

synthesizing means for synthesizing the luminous flux of said image writing light source and that of said image correcting light source;

a rotary polygon mirror for scanning said photosensitive material in said another direction by said synthesized luminous flux;

an optical system for leading said synthesized luminous flux to said photosensitive material via said rotary polygon mirror; and a control unit connected to said first beam driving means and said second beam driving means for adjusting a period and phase of the luminous flux of said image correcting light source to a period and phase of said modulated signal of said image writing light source.

* * * * *